US012782876B2

(12) United States Patent
Fostinis et al.

(10) Patent No.: US 12,782,876 B2
(45) Date of Patent: Nov. 3, 2026

(54) WATCH ADAPTED TO GENERATE A SEQUENTIAL ANIMATION

(71) Applicant: OMEGA SA, Biel/Bienne (CH)

(72) Inventors: Dimitri Fostinis, Moutier (CH); Olivier Silvant, Macolin (CH); Gregory Kissling, La Neuveville (CH); Antonio Ventura, Ecuvillens (CH); Axel Schindler, Ins (CH)

(73) Assignee: OMEGA SA, Biel/Bienne (CH)

( * ) Notice: Subject to any disclaimer, the term of this patent is extended or adjusted under 35 U.S.C. 154(b) by 537 days.

(21) Appl. No.: 18/348,018

(22) Filed: Jul. 6, 2023

(65) Prior Publication Data

US 2024/0094678 A1 Mar. 21, 2024

(30) Foreign Application Priority Data

Sep. 19, 2022 (EP) .................................... 22196422

(51) Int. Cl.
*G04B 45/00* (2006.01)

(52) U.S. Cl.
CPC ..... *G04B 45/0023* (2013.01); *G04B 45/0038* (2013.01)

(58) Field of Classification Search
CPC .............................. G04B 19/04; G04B 19/044
See application file for complete search history.

(56) References Cited

U.S. PATENT DOCUMENTS

2009/0073816 A1* 3/2009 Ozawa .................. G04B 39/02 368/300
2009/0257323 A1* 10/2009 Soltani .............. G04B 37/0427 368/309
2022/0291632 A1* 9/2022 Martel ................... G02B 27/60
2022/0413443 A1* 12/2022 Christan ............. G04B 47/044

FOREIGN PATENT DOCUMENTS

CH 700261 A2 * 7/2010 ........... G04B 45/003
EP 3839647 A1 6/2021
EP 4057082 A1 9/2022

OTHER PUBLICATIONS

European Search Report of No. 22196422.4 dated Jan. 27, 2023.

* cited by examiner

*Primary Examiner* — Renee S Luebke
*Assistant Examiner* — Matthew Daniel Hwang
(74) *Attorney, Agent, or Firm* — Sughrue Mion, PLLC

(57) ABSTRACT

A watch (10) including a case (11) including a middle (12) to which a crystal (13) and a transparent back (14) are fastened so as to form an internal volume. The watch includes a horological movement (15) housed within the internal volume of the case (11), including a carrying structure through which extends an arbor (16) adapted to be rotated by the horological movement (15) and carrying, at one of the ends thereof, opposite the crystal (13), a time value indicator (17), and at the other end, opposite the back (14), a disc (18) on which extends a pattern (181) facing a graphical representation (142), the pattern (181) and the graphical representation (142) being shaped such that, when (Continued)

the arbor (16) is rotating, they cooperate with one another to generate a sequential animation by moiré effect, formed by a sequence of at least two distinct images.

10 Claims, 5 Drawing Sheets

WATCH ADAPTED TO GENERATE A SEQUENTIAL ANIMATION

CROSS REFERENCE TO RELATED APPLICATIONS

This application is claiming priority based on European Patent Application No. 22196422.4 filed on Sep. 19, 2022.

TECHNICAL FIELD OF THE INVENTION

The invention relates to the horology field, and in particular to horological complications.

More particularly, the invention relates to a watch adapted to generate a sequential animation.

TECHNOLOGICAL BACKGROUND

In order to stand out from the competition and to offer attractive products, watch manufacturers pay particular attention to the aesthetic appeal of watches. To this end, the decoration of the external elements of a watch, including the dial, bezel and displays, and any horological complications are often the subject of significant development and design efforts.

Animations are a part of the response to this need. Moreover, they often contribute to the reputation of a watch. These animations are formed, for example, by horological complications such as a tourbillon, a lunar phase, or a chronograph, etc. or by an oscillating weight.

The present invention relates to this issue of providing a user with a watch that has a unique and particularly attractive appearance.

SUMMARY OF THE INVENTION

To this end, the invention relates to a watch comprising a case including a middle to which a crystal and a transparent back are fastened so as to form an internal volume. Said watch comprises a horological movement housed within the internal volume of the case, including a carrying structure through which extends an arbor adapted to be rotated by said horological movement and carrying, at one of the ends thereof that opens out beyond said carrying structure, opposite the crystal, a time value indicator, and at the other end opening out beyond said carrying structure, opposite the back, a disc on which extends a pattern facing a graphical representation. The pattern and the graphical representation are shaped such that, when the arbor is rotating, they cooperate with one another to generate a sequential animation by moiré effect, formed by a sequence of at least two distinct images.

Thanks to the features of the invention, an animation is generated by taking advantage of the energy supplied by the horological movement. In particular, the rotation of the disc generates an animation with a relatively high speed.

Moreover, the invention advantageously and in particular allows an animation to be generated from an existing, conventional, horological movement, without the need for major modifications thereto.

According to specific embodiments, the invention can further include one or more of the following features, which must be considered singly or according to any combination technically possible.

According to specific embodiments, the graphical representation is formed on a crystal of the back.

According to specific embodiments, the pattern and the graphical representation are shaped such that, when the arbor is rotating, they cooperate with one another to generate a sequential animation formed by a sequence of four distinct images.

According to specific embodiments, the time value indicator is a seconds hand, the arbor being rotated such that it makes one complete revolution in one minute.

According to specific embodiments, the pattern and the graphical representation are shaped such that, between two successive images generated, the disc pivots by six degrees.

According to specific embodiments, the back is formed by a fastening ring onto which a crystal is driven, the graphical representation extending over one face of said crystal.

According to specific embodiments, the fastening ring is screwed against the middle by a plurality of screws distributed around the periphery thereof, each engaged inside a threaded hole extending into the middle.

According to specific embodiments, the graphical representation is produced by depositing a thin layer on a face of the back that is arranged opposite the horological movement and forming a set of opaque areas.

According to specific embodiments, the pattern is formed by a plurality of identical spirals extending from the centre of the disc to the periphery thereof, and being evenly distributed around the centre of the disc, said pattern being formed by depositing a thin layer on a face of the disc arranged facing the back.

According to specific embodiments, the disc and the crystal are separated from one another by a distance of less than 0.5 mm.

According to specific embodiments, the disc advantageously has a diameter of about 10 mm.

According to specific embodiments, the pattern and the graphical representation are shaped such that the sequential animation consists of displacing an element in a rectilinear direction.

BRIEF DESCRIPTION OF THE FIGURES

Other features and advantages of the invention will become apparent upon reading the following detailed description given by way of a non-limiting example, and with reference to the accompanying drawings, wherein.

It should be noted that the figures are not necessarily drawn to scale for clarity purposes.

DETAILED DESCRIPTION OF THE INVENTION

The invention relates to a watch 10 adapted to generate a sequential animation that is in particular visible through a transparent back 14.

Figure 1:
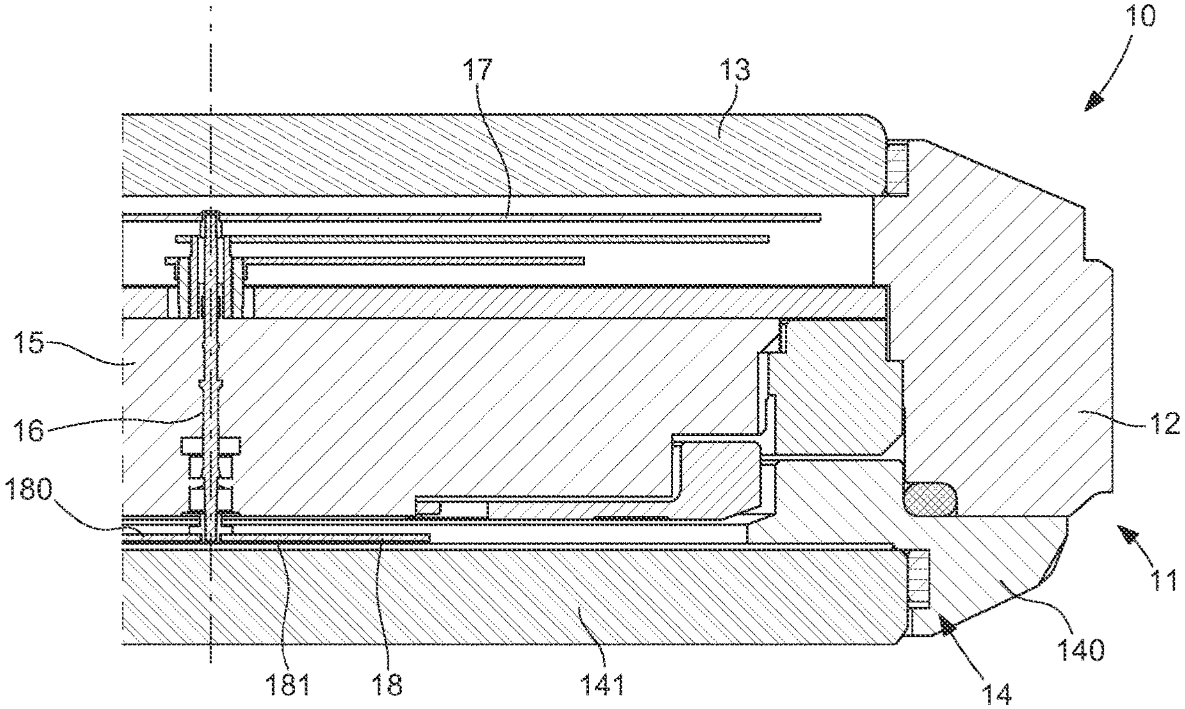
FIG. 1 diagrammatically shows a partial, sectional view of a watch according to a preferred example embodiment of the invention.
Figure 2:
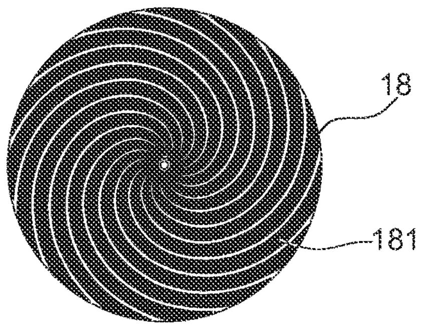
FIG. 2 shows a top view of a disc of the watch in FIG. 1.

As illustrated in the sectional view in FIG. 1, the watch 10 includes a case 11 comprising a middle 12 to which a crystal 13 and the transparent back 14 are fastened. The middle 12, the crystal 13 and the back 14 form an internal volume in which a horological movement 15 diagrammatically shown in FIG. 1 is housed.

The back 14 is formed, in particular in the preferred example embodiment of the invention, by a fastening ring 140 onto which a crystal 141 is driven, as shown in FIG. 1. Preferably, this fastening ring 140 is screwed against the middle 12 by a plurality of screws 120 distributed around the periphery thereof, each of the screws 120 being engaged inside a threaded hole extending into the middle 12. This feature, visible in FIGS. 4 to 7, allows the back 14 to be fastened to the middle 12 in a very precise relative angular position.

The horological movement 15 includes a carrying structure through which an arbor 16 extends and which is kinematically linked to a drive member of the horological movement 15 such that it is rotated. The carrying structure is known per se to a person skilled in the art and consists of bridges and/or a plate. In the same way, the drive member of the horological movement 15 is known per se by a person skilled in the art and can be formed by a mainspring or an electric motor, etc.

The arbor 16 extends between two ends, one whereof, referred to as the "upper end", opens out beyond said carrying structure, opposite the crystal 13, and the other whereof, referred to as the "lower end", opens out beyond said carrying structure, opposite the back 14.

The terms "upper" and "lower" relate to the disposition of the watch in FIG. 1 and are chosen to make the invention easier to understand.

The arbor 16 carries, at the upper end thereof, a time value indicator 17, preferably formed by a seconds hand, as shown in FIG. 1 in one example embodiment of the invention, and at the lower end thereof, a disc 18.

The time value indicator 17 and the disc 18 can each be fastened to the arbor 16 via a pipe, as shown in FIG. 1.

The arbor 16 is thus preferably rotated such that it makes one complete revolution in one minute. The arbor 16 is thus rotated by six degrees every second.

The disc 18 includes a body 180 on which an opaque pattern 181 extends, preferably on a face arranged opposite the back 14. The pattern 181 has, in the example embodiment shown in FIGS. 2 and 4 to 7, the overall shape of a plurality of spirals all starting from the same centre point of the disc 18 and extending from said centre to the periphery of the disc 18. Said spirals are identical to one another and each represents a portion of an Archimedean spiral. These spirals are evenly distributed around the centre of the disc 18, preferably extending about an angle of twenty-four degrees and are preferably separated from one another by an angle of six degrees. In other words, considering that each spiral is defined between two curves shaped as Archimedean spirals, said curves delimiting the contours of said spiral, the distance between said curves is representative of a rotation of the disc 18 about an angle of twenty-four degrees. Similarly, if two adjacent spirals are considered to be separated by two curves shaped as Archimedean spirals, the distance between these two curves is representative of a rotation of the disc 18 about an angle of six degrees.

Preferably, the pattern 181 is produced by deposition of a thin layer, for example a metal layer. The body 180 of the disc 18 can be made of a transparent material, for example glass or sapphire, or an opaque material, such as a metal or polymer.

Figure 3:
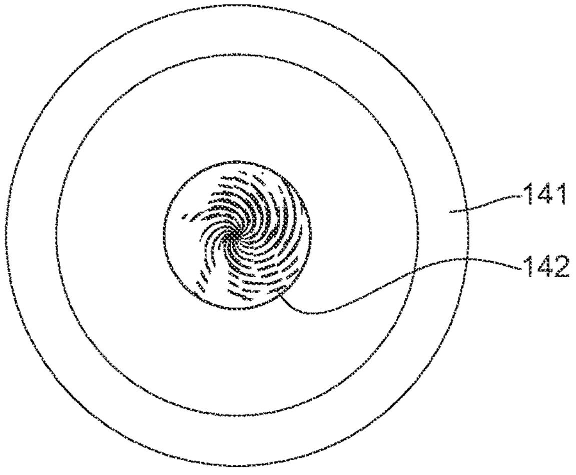
FIG. 3 shows a top view of a crystal of the watch in FIG. 1.
Figure 4:
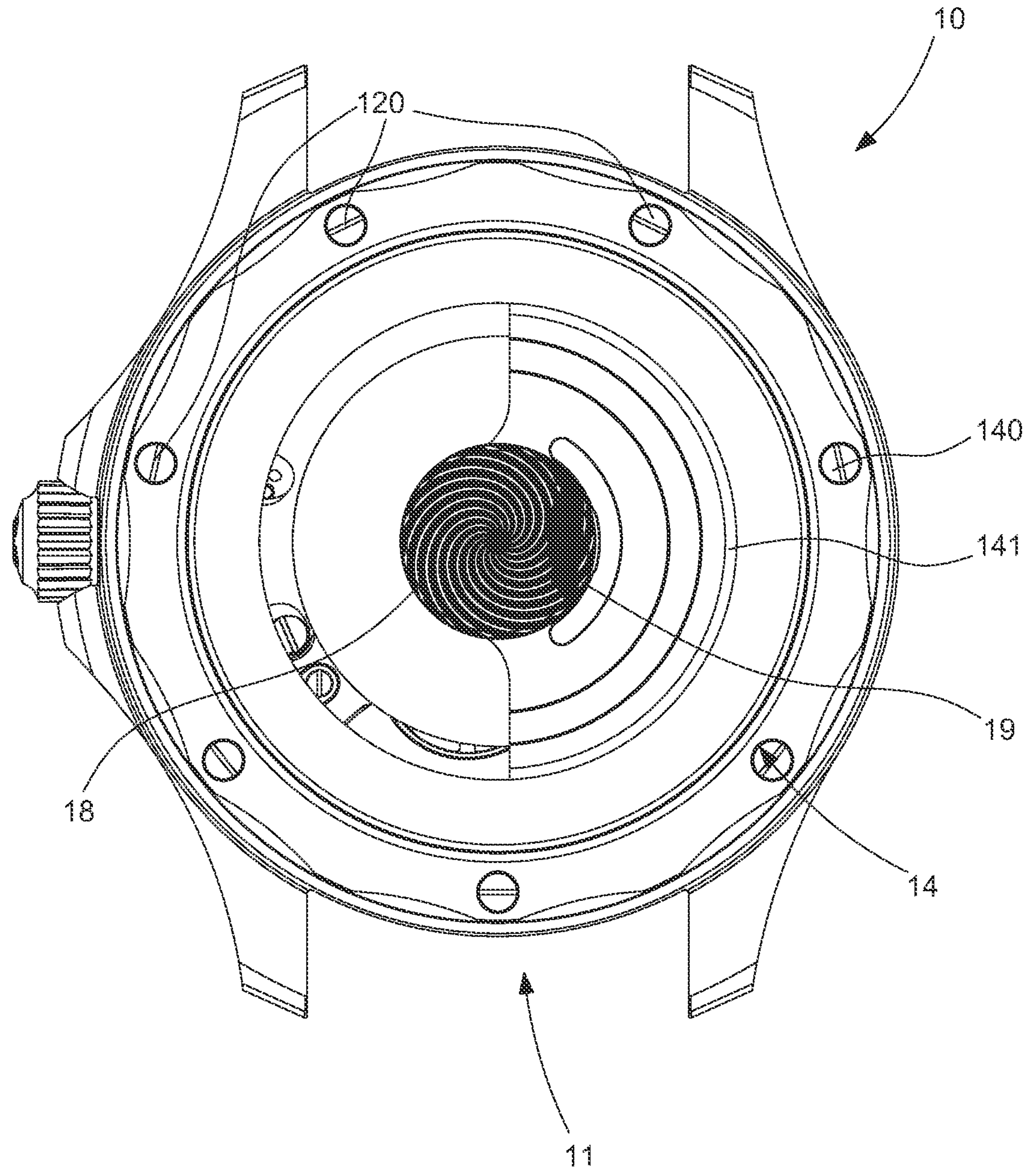
FIGS. 4 to 7 show a bottom view of the watch in FIG. 1, in which figures the disc occupies different successive angular positions so as to generate distinct images forming a sequential animation.
Figure 5:
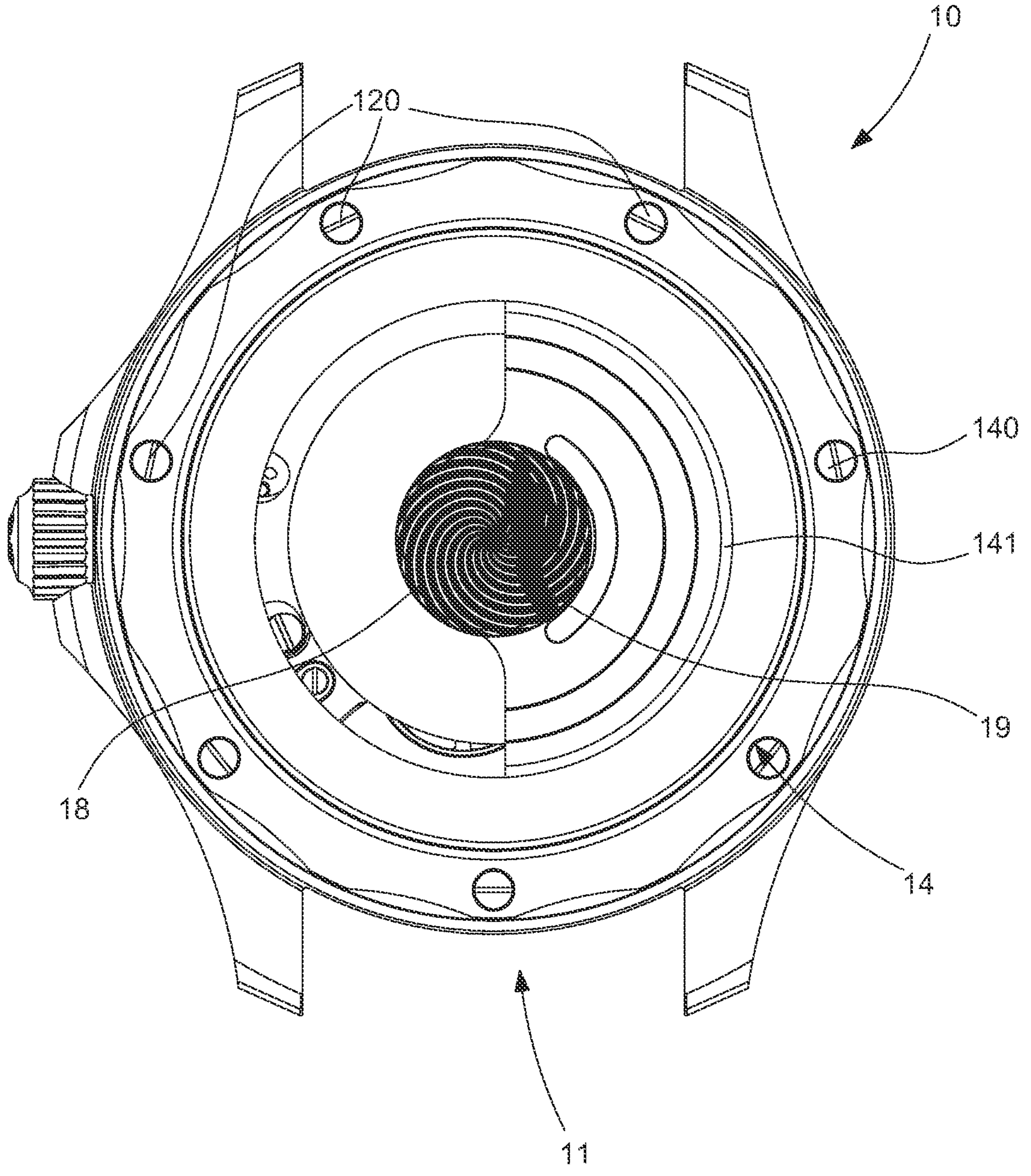
Figure 6:
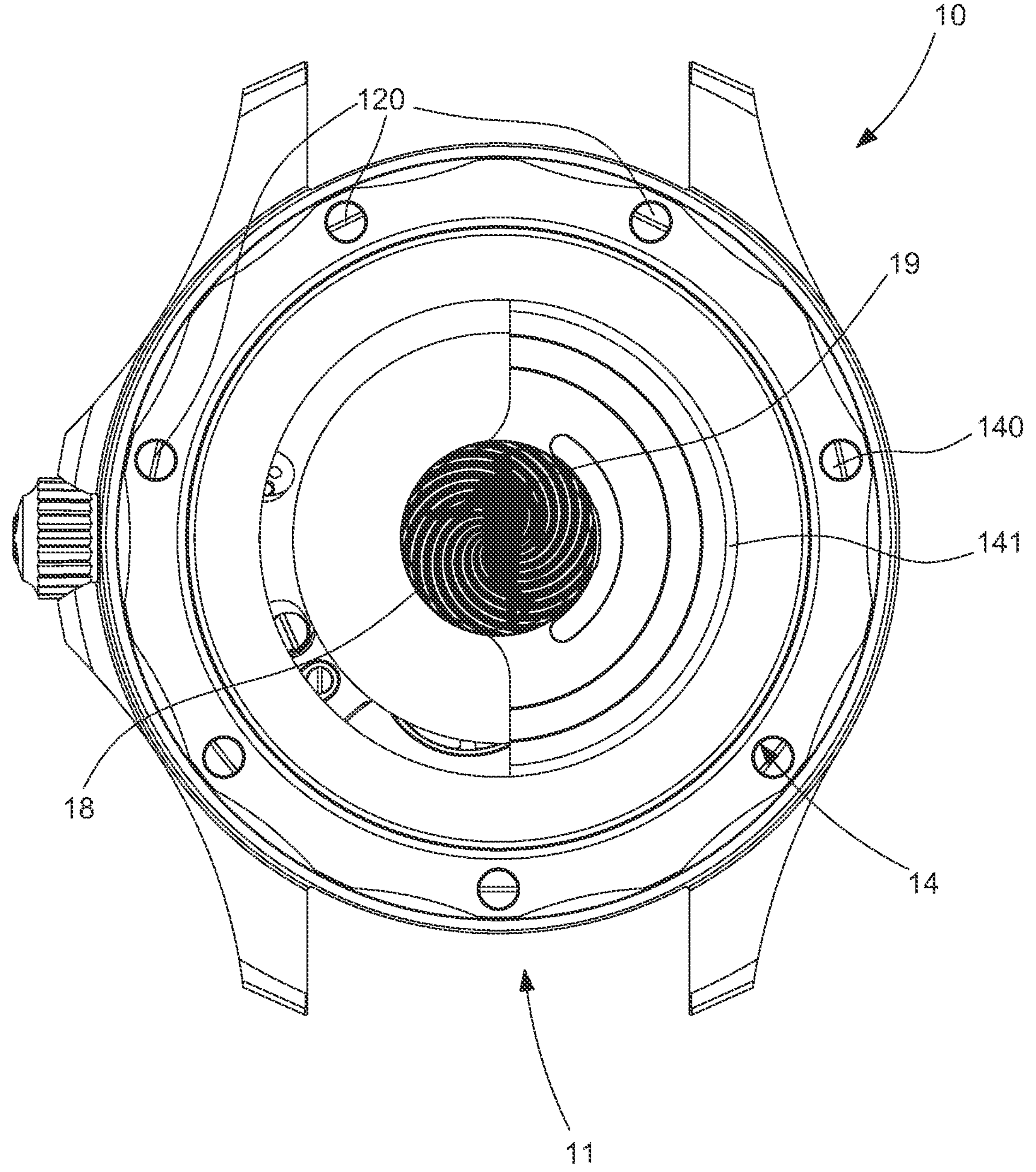
Figure 7:
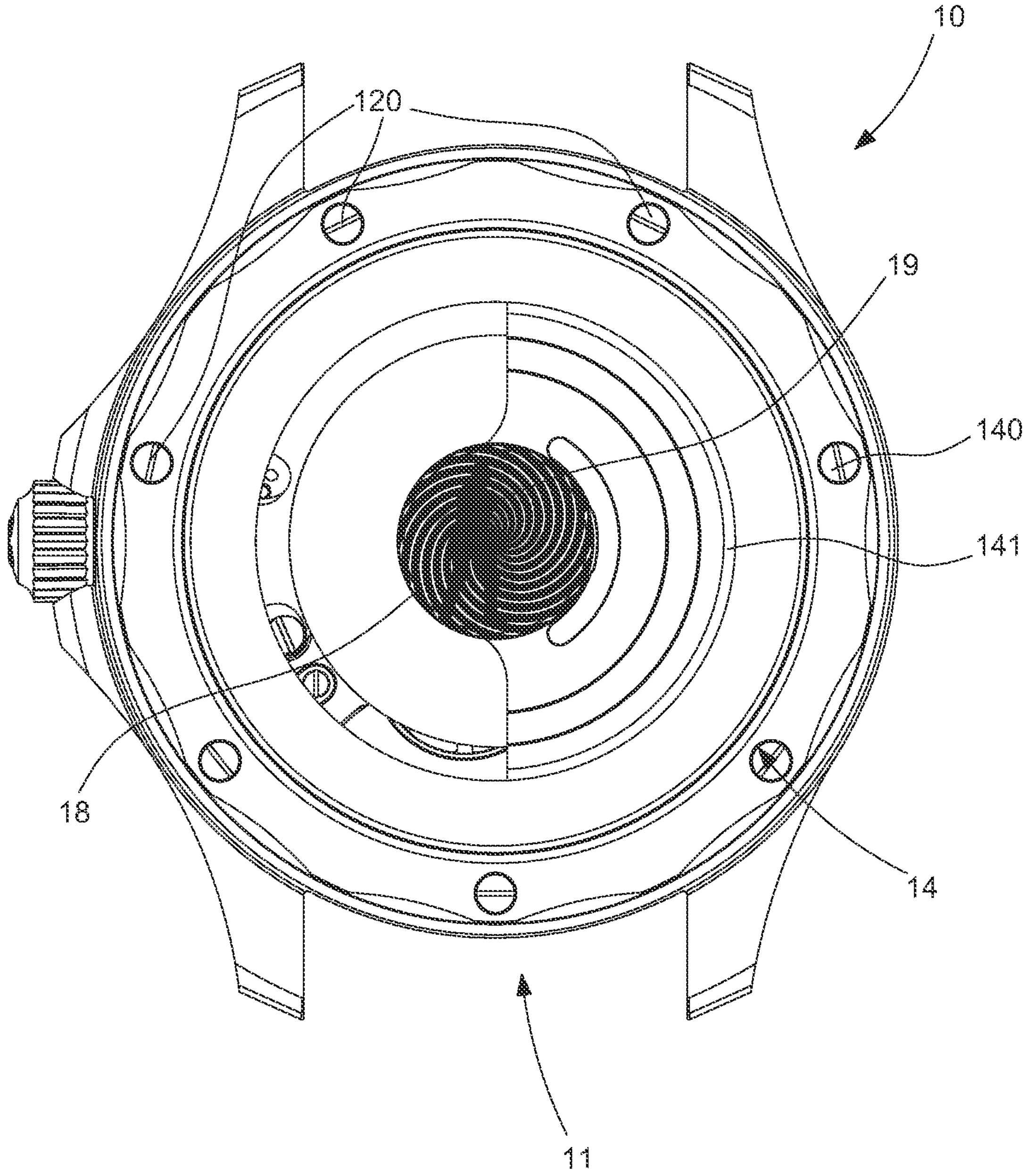

Preferably, the back 14 includes, on a face of the crystal 141 opposite the horological movement 15, a graphical representation 142 such as that shown in FIG. 3 in an example embodiment of the invention.

In particular, the graphical representation 142 is formed by a set of opaque areas contrasting with the transparency of the rest of the crystal 141 of the back 14. Preferably, the graphical representation 142 is produced by deposition of a thin layer, for example a metal layer.

The pattern 181 and the graphical representation 142 can be produced by screen printing, transfer printing, surface treatment, painting, or enamelling, etc.

The graphical representation 142 and the pattern 181 are arranged so as to be opposite one another. More specifically, they are arranged such that the pattern 181 is opposite at least a part of the graphical representation 142. Moreover, the graphical representation 142, and in particular the opaque areas, are shaped such that the alignment thereof with the disc 18 generates an image, depending on the angular position of said disc 18, as shown in FIGS. 4 to 7.

In particular, due to the transparency of the crystal 141 of the back 14, all or part of certain opaque areas are visible when they extend opposite the spaces separating two adjacent spirals of the pattern 181. The rest of the opaque areas and/or parts of opaque areas are thus arranged facing the spirals, and are thus concealed.

To summarise, the image is generated by a cooperation between the graphical representation 142 and the pattern 181. This makes it important to control the angular position of the back 14 relative to the middle 12 so that the image generated by the cooperation between the pattern 181 and the graphical representation 142 is free of errors, for example resulting from a misalignment between said pattern 181 and said graphical representation 142.

In particular, the pattern 181 and the graphical representation 142 are shaped such that, when the arbor 16 is rotating, they cooperate with one another to generate a sequential animation by moiré effect, formed by a sequence of at least two distinct images appearing through the back 14, a new image being generated with each successive rotation of the disc 18. The rotation of the arbor 16 thus generates a visual effect of a homogeneous merging of the colours of the pattern 181 and of the body of the disc 18.

In the example embodiments shown in the figures, the rotation of the arbor 16, and thus of the disc 18, allows a sequential animation to be generated by moiré effect, formed by four successive images, as seen in FIGS. 4 to 7. This sequential animation consists, in the preferred example embodiment of the invention, of displacing an element 19, in this case a character, in a rectilinear direction, as shown successively in the aforementioned figures.

Taking into consideration the dimensions of the spirals of the pattern 181 mentioned hereinabove, the disc 18 being driven so as to pivot by six degrees every second, fifteen animations are generated in one minute, which allows a succession of relatively dynamic and attractive animations to be obtained when the arbor 16 is rotating.

The choice of the dimensions and shapes of the pattern 181 and of the graphical representation 142, as well as the number of animations per minute, advantageously allows a clear and very easy-to-read animation to be obtained, and imposes sufficiently large manufacturing and alignment tolerances.

By way of example, the disc 18 can be arranged at a very short distance from the back 14, and from the crystal 141 in particular, so that a user cannot perceive any offset between the pattern 181 and the graphical representation 142. Preferably, the distance between the disc 18 and the crystal 141 is in the order of several tenths of a millimetre, preferably less than 0.5 mm, for example 0.2 mm.

Moreover, the disc 18 must be large enough to allow the pattern 181 to be easily seen, yet narrow enough to limit inertia and the risk of unbalance. For this purpose, the disc 18 advantageously has a diameter of several millimetres, for example, about 10 mm.

To summarise, the watch 10 includes, on a first face, the display of at least one horological function, such as the display of the current time, and on a second face, the sequential animation.

In the example embodiment described hereinabove, the animation is intended to be continuously active, driven by the horological movement 15.

However, the activation of the animation can be made conditional on the control of a horological function, or on the activation of a dedicated control member.

The invention is advantageously suited to any existing horological movement for the creation of sequential animations, at a reasonable cost. In other respects, it can potentially generate an increase in the thickness of the watch case 11, however this is negligible insofar as the additional thickness is limited to the thickness of the disc 18 and to the safety clearances between said disc 18 and the horological movement 15 on the one hand, and the crystal 141 of the back 14 on the other hand.

More generally, it should be noted that the implementations and embodiments considered above have been described by way of non-limiting examples, and that other alternatives are consequently possible.

In particular, in example embodiments of the invention not shown in the figures, the graphical representation 142 can be formed on a structural element of the horological movement 15, for example on a bridge or a plate thereof, instead of being formed on the crystal 141 of the back 14. In other words, the graphical representation 142 can be arranged on either side of the pattern 181.

Furthermore, the invention can be implemented both for watches comprising mechanical horological movements and for watches comprising electric or electromechanical horological movements.

The invention claimed is:

1. A watch comprising a case including a middle to which a crystal and a transparent back are fastened so as to form an internal volume, said watch comprising a horological movement housed within the internal volume of the case, said horological movement including a carrying structure through which an arbor extends about an axis, said arbor being adapted to be rotated about the axis by said horological movement and carrying, at one of the ends thereof that opens out beyond said carrying structure, opposite the crystal, a time value indicator, and at the other end opening out beyond said carrying structure, opposite the back, a disc on which extends a pattern facing a graphical representation, the pattern and the graphical representation being shaped to cooperate, when the arbor is rotating, to generate a sequential animation by moiré effect, formed by a sequence of at least two distinct images, wherein the time value indicator is a seconds hand, the arbor being rotated such that it makes one complete revolution in one minute, and wherein the pattern and the graphical representation are shaped such that, between two successive images generated, the disc pivots by six degrees.

2. The watch according to claim 1, wherein the graphical representation is formed on a crystal of the back.

3. The watch according to claim 1, wherein the pattern and the graphical representation are shaped to cooperate, when the arbor is rotating, to generate the sequential animation formed by a sequence of four distinct images.

4. The watch according to claim 1, wherein the back is formed by a fastening ring onto which a back crystal is driven, the graphical representation extending over one face of said back crystal.

5. The watch according to claim 4, wherein the fastening ring is screwed against the middle by a plurality of screws distributed around a periphery thereof, each being engaged inside a threaded hole extending into the middle.

6. The watch according to claim 1, wherein the graphical representation is produced by depositing a thin layer on a face of the back that is arranged opposite the horological movement and forming a set of opaque areas.

7. The watch according to claim 1, wherein the disc has a diameter of about 10 mm.

8. The watch according to claim 1, wherein the pattern and the graphical representation are shaped such that the sequential animation consists of displacing an element in a rectilinear direction.

9. A watch comprising a case including a middle to which a crystal and a transparent back are fastened so as to form an internal volume, said watch comprising a horological movement housed within the internal volume of the case, said horological movement including a carrying structure through which an arbor extends about an axis, said arbor being adapted to be rotated about the axis by said horological movement and carrying, at one of the ends thereof that opens out beyond said carrying structure, opposite the crystal, a time value indicator, and at the other end opening out beyond said carrying structure, opposite the back, a disc on which extends a pattern facing a graphical representation, the pattern and the graphical representation being shaped to cooperate, when the arbor is rotating, to generate a sequential animation by moiré effect, formed by a sequence of at least two distinct images, wherein the pattern is formed by a plurality of identical spirals extending from the centre of the disc to a periphery thereof, and being evenly distributed around the centre of the disc, said pattern being formed by depositing a thin layer on a face of the disc arranged facing the back.

10. A watch comprising a case including a middle to which a crystal and a transparent back are fastened so as to form an internal volume, said watch comprising a horological movement housed within the internal volume of the case, said horological movement including a carrying structure through which an arbor extends about an axis, said arbor being adapted to be rotated about the axis by said horological movement and carrying, at one of the ends thereof that opens out beyond said carrying structure, opposite the crystal, a time value indicator, and at the other end opening out beyond said carrying structure, opposite the back, a disc on which extends a pattern facing a graphical representation, the pattern and the graphical representation being shaped to cooperate, when the arbor is rotating, to generate a sequential animation by moiré effect, formed by a sequence of at least two distinct images, wherein the disc and the crystal are separated from one another by a distance of less than 0.5 mm.

* * * * *